United States Patent [19]

Segawa et al.

[11] 4,268,259
[45] May 19, 1981

[54] MULTI-SPEED SPROCKETS FOR A BICYCLE AND THE LIKE

[75] Inventors: Takashi Segawa; Tadashi Ueno, both of Sakai, Japan

[73] Assignee: Shimano Industrial Company Limited, Osaka, Japan

[21] Appl. No.: 934,619

[22] Filed: Aug. 17, 1978

[30] Foreign Application Priority Data

Aug. 25, 1977 [JP] Japan .......................... 52/114127[U]
Aug. 25, 1977 [JP] Japan .......................... 52/114128[U]

[51] Int. Cl.³ .............................................. F16H 55/30
[52] U.S. Cl. ....................................... 474/160; 474/164
[58] Field of Search ............. 74/243 R, 243 S, 217 B, 74/229

[56] References Cited

U.S. PATENT DOCUMENTS

| 619,537 | 2/1899 | Bufford | 74/243 R |
| 3,478,614 | 11/1969 | Shimano | 74/243 R |
| 3,772,932 | 11/1973 | Nagano | 74/243 R |
| 3,956,943 | 5/1976 | Yamasaki | 74/243 R |
| 4,018,095 | 4/1977 | Shimano | 74/243 R |

Primary Examiner—Kenneth Dorner
Attorney, Agent, or Firm—Stevens, Davis, Miller & Mosher

[57] ABSTRACT

Multi-speed sprockets are assembled with at least one larger diameter sprocket and at least one smaller diameter sprocket, in which the center of a space between certain adjacent teeth of the larger diameter sprocket is positioned on a tangent line drawn from the center of a space between certain adjacent teeth at the smaller diameter sprocket, and the distance between both centers is made substantially equal to an integer multiple of the pitch of a driving chain.

8 Claims, 5 Drawing Figures

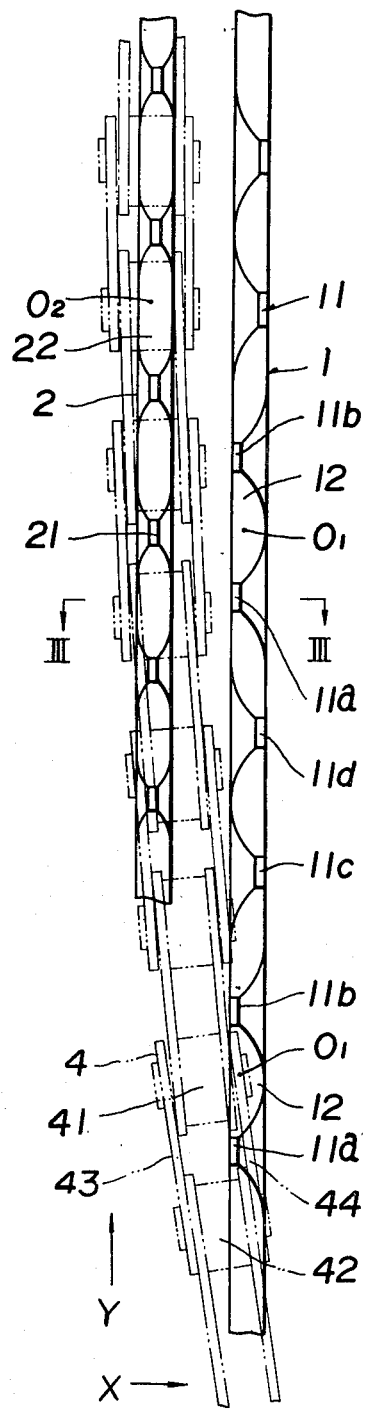
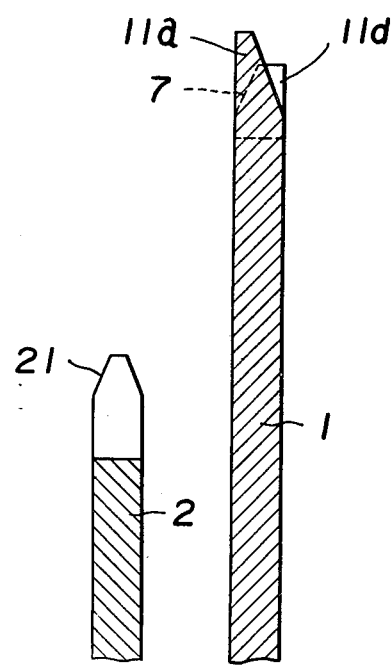
FIG. 2
FIG. 3

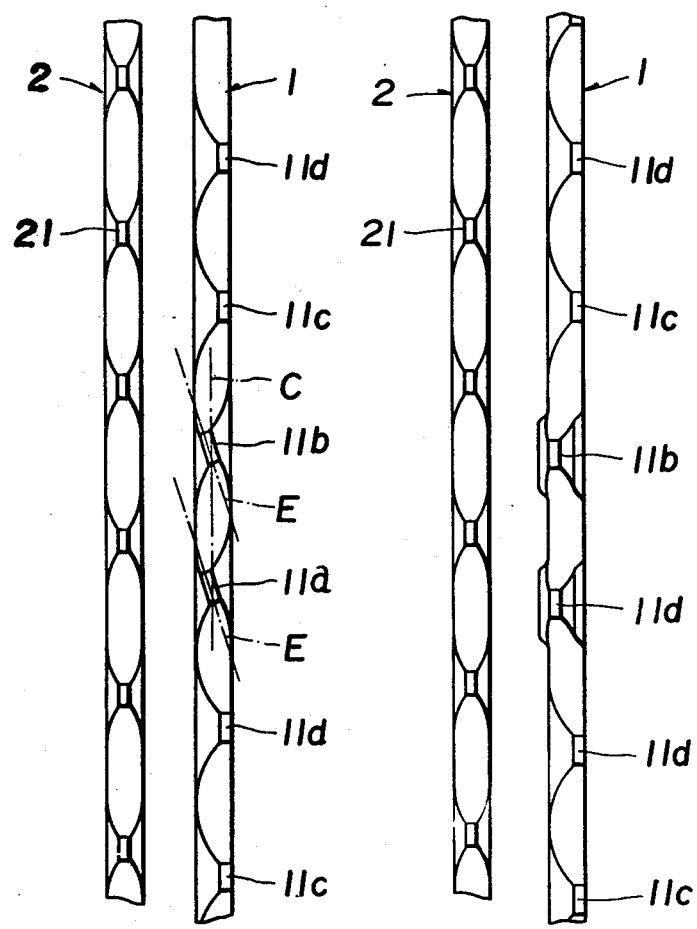

MULTI-SPEED SPROCKETS FOR A BICYCLE AND THE LIKE

This invention relates to multi-speed sprockets for a bicycle and the like, and more particularly to a multi-speed sprocket assembly having at least one larger diameter sprocket and at least one smaller diameter sprocket, mounted to a crank or rear hub of the bicycle so that a driving chain is switched to one of the sprockets for changing the bicycle speed.

Generally, the multi-speed sprocket assembly having different diameter sprockets is mounted to the crank or rear hub of the bicycle so that the driving chain is switched to one of the sprockets through a derailleur for changing the speed. In this instance, the chain is switched relatively smoothly from the larger diameter sprocket to the smaller diameter one, but when the sequence is reversed, the chain does not mesh well with the larger diameter sprocket having more teeth than the smaller diameter one, resulting in lost motion or noises.

The larger diameter sprocket has previously been manufactured whose teeth have been shaped or positioned to facilitate mesh with the chain, but the aforesaid problem has not been solved.

The development of the present invention indicates that the poor speed change efficiency results from the positional relationship between the teeth of each of the different diameter sprockets which are assembled at a regular interval.

In detail, the chain is moved axially from the sprockets in a fixed position by the fixed derailleur. Hence, when the chain is switched, for example, from the smaller diameter sprocket to the larger diameter sprocket, the length and tilt angle of the chain between the final mesh point of a tooth of the smaller diameter sprocket just before the chain departs therefrom, and the point where the chain is at first caught by a tooth of the larger diameter sprocket to be meshed therewith, are always constant, but the distance across which the tooth of each of the sprockets is meshed with the chain is variable, because the tooth position of each of the sprockets varies relative to each other.

Consequently, in spite of the constant length of chain between the points to be meshed with each of the sprockets, the tooth at the larger diameter sprocket varies in its position when in mesh, whereby the aforesaid length of chain is occasionally not coincident with the distance between the teeth in mesh. Hence, a poor speed-change occurs even with proper control.

In view of the fact that the poor speed-change efficiency is caused by fluctuation of the aforesaid distance between the teeth with respect to the aforesaid length of chain, this invention has been designed. The invention improves the speed-change efficiency by removing the defect in speed change of conventional multi-speed sprockets. The invention provides for an assembly of sprockets in such a manner that the center of the space between certain adjacent teeth of the larger diameter sprocket meets a tangent line drawn from the center of a space between certain adjacent teeth at the smaller diameter sprocket, and the distance between the center of the spaces is made substantially equal to the sum of an integer multiple of the pitch chain.

These and other objects and features of the invention will be more apparent from the following description of an embodiment thereof in accordance with the accompanying drawings, in which:

FIG. 2 is a partially enlarged side view thereof,

FIG. 3 is an enlarged sectional view taken on Line III—III in FIG. 2, and

FIGS. 4 and 5 are partially enlarged side views of modified embodiments of the invention respectively.

Figure 1:
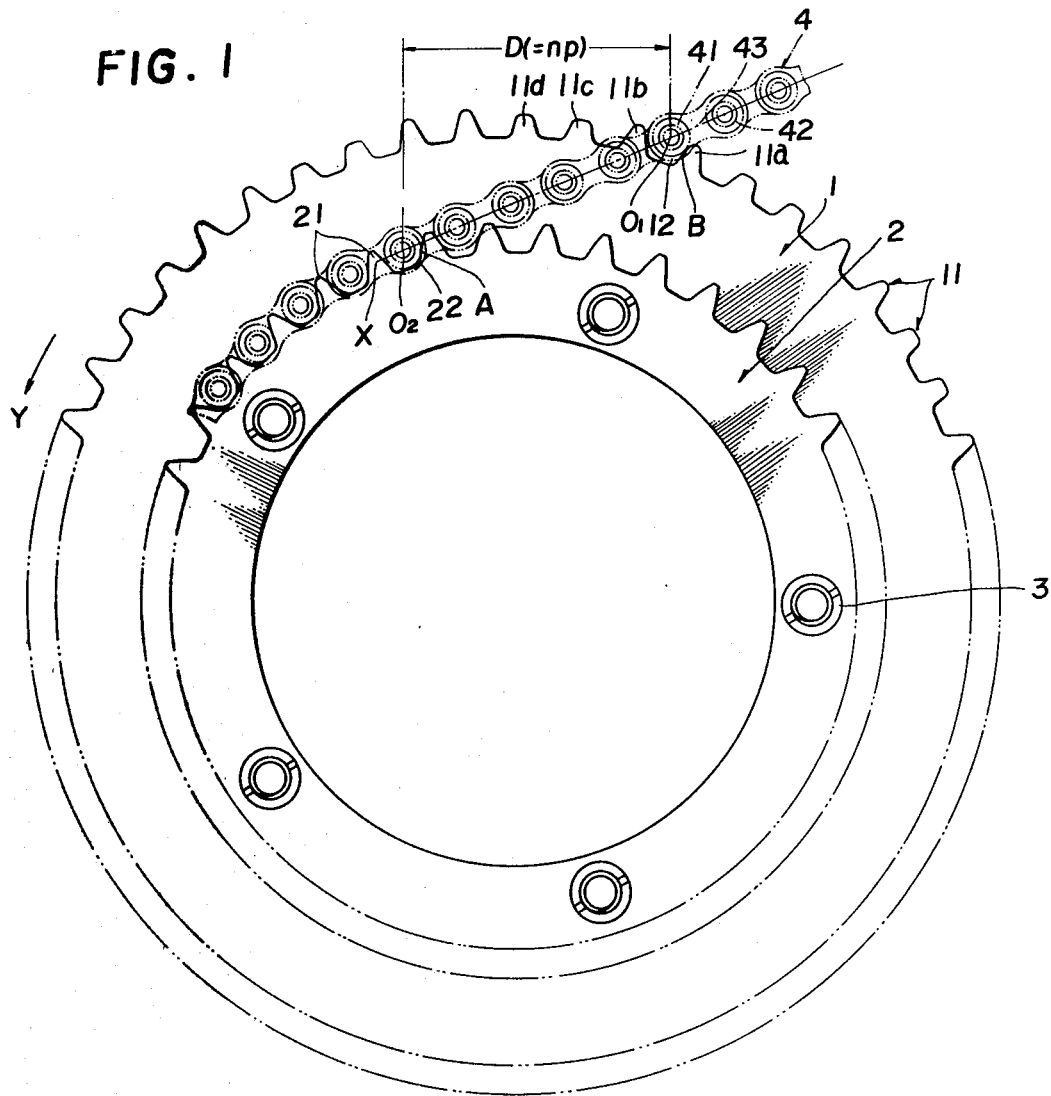
FIG. 1 is a partially omitted front view of the embodiment of the invention.

The multi-speed sprockets of the invention are applicable to a crank or a rear hub of the bicycle.

FIG. 1 represents the sprockets mounted to the crank of the bicycle, which comprise a larger diameter sprocket 1 and a smaller diameter sprocket 2. The sprockets 1 and 2 are connected axially at a regular interval by means of connectors 3 and attached therewith to arms radially extending from the crank. A driving chain 4 is stretched across the larger diameter sprocket 1 or smaller diameter sprocket 2 and the sprockets are attached to the rear hub. The chain 4 is moved axially from the sprockets by a derailleur mounted radially outward from of the larger diameter sprocket 1 and switched to the sprocket 1 or 2, thereby transmitting the driving force to the rear wheel at a given speed-change ratio.

The chain 4 is, when switched, always moved from the same spot, whereby a length of the chain switched from the smaller diameter sprocket 2 to the larger diameter sprocket 1 is constant between the point A where the chain is meshed with the sprocket 2 just before departing therefrom, and B where the chain is first caught by a tooth of the larger diameter sprocket 1 to be meshed therewith, and the tilt angle of the chain with respect to the sprockets 1 and 2 is also constant. However, points A and B at the sprockets 1 and 2 are not fixed, whereby the distance between the points A and B at the sprocket 1 fluctuates due to a position of the tooth 11 at the sprocket 1 relative to that of tooth 21 at the sprocket 2. In other words, if the center of a space between certain adjacent teeth 21 of the smaller diameter sprocket 2 is represented by $O_2$, and the center of a space between certain adjacent teeth 11 of the larger diameter sprocket 1 is represented by $O_1$ as shown in FIG. 1, when the chain 4 is stretched across the centers $O_2$ and $O_1$ during switching from the sprocket 2 to 1, the center $O_1$ is not always on a tangent line X—X or a line drawn from the center $O_2$ on the tangent plane with respect to the smaller diameter sprocket 2 and along a travel of the chain 4 when switched from the sprocket 2 to 1 for changing the speed, but one of the teeth 11 or a midpoint between the center $O_1$ and one of the teeth 11 may be positioned on the tangent line X—X.

The invention is directed to assemble each of the aforesaid sprockets 1 and 2 at a regular axial interval in such a manner that the center $O_1$ of a space 12 between certain adjacent teeth 11 at the sprocket 1 is positioned on the aforesaid tangent line X—X drawn from the center $O_2$ of a space 22 between certain adjacent teeth 21 at the sprocket 2; and the distance D between the centers $O_1$ and $O_2$ is made substantially equal to an integer multiple nP of pitch P of the chain 4.

When switching the chain 4 from the smaller diameter sprocket 2 to the larger diameter sprocket 1, the distance D of nP insures a mesh of the chain with the sprocket 1 in such a manner that link plates 43 and 44 between rollers 41 and 42 positioned to be meshed with the sprocket 1 as shown in FIGS. 1 and 2, face a tooth 11a at the sprocket 1, the tooth 11a being positioned rearwardly in the forward rotating direction (the arrow Y direction) of the sprockets 1 and 2, whereby the rotating sprockets in the direction of arrow Y allow the link plates 43 and 44 to be meshed reliably with the tooth 11a. At this time, neither roller 41 or 42 interferes with the mesh of the tooth 11a between the link plates 43 and 44.

However, the aforesaid relationship between the teeth 11 and 21 is not applicable to all the teeth of sprockets 1 and 2 due to the different number of teeth on each. For example, when the larger diameter sprocket 1 has 52 teeth and the smaller diameter sprocket 2 has 39, the greatest common divisor of 52 and 39 is 13 which is the number to be applied to the combinations of teeth having the aforesaid relationship at both the sprockets.

In this instance, the aforesaid positional relationship is applicable to every four teeth of the sprocket 1, whereby the chain can be meshed reliably with the tooth 11a at every fourth tooth.

Furthermore, among a large number of teeth 11 of the larger diameter sprocket 1, the tooth 11a and at least one of teeth 11b adjacent thereto are paired to form one of a first group. The teeth 11a and 11b of one of the first groups are, as shown in FIGS. 2, 3, 4 and 5, located toward the smaller diameter sprocket 2 with respect to the center line of thickness of the sprocket 1, thereby further improving the speed-change efficiency.

The tooth 11a is positioned rearwardly in the forward rotating direction (the arrow Y direction) of the sprockets with respect to the tangent line X—X drawn from the center $O_2$ as previously described and is forwardly facing the center $O_1$ of the space 12 between the teeth 11a and 11b at the sprocket 1, where the tooth 11b may be positioned ahead of or behind 11a in the direction Y.

The teeth 11a and 11b of each of the first groups can be shifted in such a manner that the tips of the teeth are slanted at one side thereof as shown in FIGS. 2 and 3, slanting the teeth forwardly toward the sprocket 2 along the line E skewed with respect to the center line C of thickness of the sprocket 1, or partially swelling the sprocket 1 at the teeth 11a and 11b toward the sprocket 2 as shown in FIG. 5. Such shifted teeth facilitate meshing of the chain therewith, whereby the speed-change efficiency is improved in attendance with the aforesaid distance from $O_1$ to $O_2$ of the integer multiple of pitch of the chain 4.

Also, each of the second groups includes in a pair a tooth 11c and at least one of the teeth 11d adjacent thereto at the sprocket 1, the teeth 11c and 11d being apart from the teeth 11a and 11b. The distance between the tooth 11c and the center $O_2$ of space 22 between the teeth 21 at the smaller diameter sprocket 2 is considerably different from the integer multiple nP of the pitch P of the chain. Each of the second groups is, shifted remotely from the sprocket 2 with respect to the center line of thickness of the sprocket 1, reverse from the first groups, thereby further improving the speed-change efficiency.

The teeth 11c and 11d in each of the second groups, which are not meshed with the chain 4, are slanted at one side reverse to the slant of teeth 11a and 11b as shown in FIGS. 2 and 3, thereby being shifted away from the sprocket 2 and are not in mesh, or cut out at tips as shown in FIGS. 1 and 3. Thus, the chain 4 is, when switched from the larger diameter sprocket 1 to the smaller diameter one 2, easily removable from the teeth 11c and 11d, and is, when shifted from sprocket 2 to the sprocket 1, shifted to a larger extent toward the sprocket 1 thereby reducing noise.

Incidentally, the number of teeth included in the first and second groups may be defined due to the number of teeth of each sprocket, and a difference in the number of teeth thereof, in which two or more are sufficient.

In addition to the embodiment of two assembled sprockets according to the foregoing the multi-speed sprockets of more than two, e.g., three to five, sprockets may be similarly constructed to be used for the rear hub.

Next, meshing the chain 4 with the sprockets 1 and 2 for changing the speed, will be explained in accordance with FIGS. 1 and 2.

In the drawings, the chain 4 is being switched from the smaller diameter sprocket 2 to the larger diameter sprocket 1 by being moved in the X direction by the movable member of the derailleur. At this time, a portion of the chain 4 ahead of the forward rotating direction Y of the sprockets 1 and 2 still remains meshed with the sprocket 2, and at the control side of the derailleur the chain is shifted over the sprocket 1 to become skewed with respect to the sprockets as shown in FIG. 2.

In this instance, when the distance between the aforesaid mesh point A at the sprocket 2 and mesh point B at the sprocket 1 is identical with the integral multiple nP of the chain, or in other words, when the distance D between the centers $O_1$ and $O_2$ is identical with nP, the tooth 11a at the sprocket 1 can immediately catch the skewed chain 4 and be meshed therewith. At this time, if the tooth 11a is meshed between the inner link plates of the chain the tooth 11b adjacent to the tooth 11a can rapidly catch the outer link plates following the inner link plates. On the other hand, when the chain 4 is caught by the tooth 11c or 11d whose position have no relationship with the distance D of integer multiple nP, a tooth 11a or 11b at a next first group in continuation with the second group can rapidly catch the chain 4 to be meshed therewith. Hence, the chain can, as a whole, be switched quickly from the smaller diameter sprocket 2 to the larger diameter sprocket 1, thereby improving the speed-change efficiency.

While, when switching from the larger diameter sprocket 1 to the smaller diameter sprocket 2, the chain 4 can quickly leave the sprocket 1 through non-meshing teeth 11c and 11d of the second groups, thereby quickly meshing with the sprocket 2 to improve the speed-change efficiency.

As clearly understood from the aforesaid description, the multi-speed sprockets of the invention employ standard sprockets not particularly shaped or positioned, thereby reducing lost motion to improve the speed-change efficiency.

Also, the multi-speed sprockets of the invention further improve the speed-change efficiency by a construction whereby the distance between the center the space between certain adjacent teeth at one sprocket and that of another, is made substantially equal to the integer multiple of pitch of the chain, and the teeth of the larger diameter sprocket are divided into teeth positioned a distance of the integer multiple of pitch of the chain and into teeth which are not so spaced, whereby the teeth positioned at the aforesaid distance are shaped or positioned to facilitate the mesh thereof with the chain, and those not so are shaped or positioned not to contact with the chain, whereby the chain is made easily removable from the larger diameter sprocket when switched therefrom to the smaller diameter sprocket.

As many different embodiments of this invention may be made without departing from the spirit and scope thereof, it is to be understood that the invention is not limited to the specific embodiment thereof except as defined in the appended claims.

What is claimed is:

1. Multi-speed sprockets for a bicycle and the like, comprising at least one small diameter sprocket having at the outer periphery thereof a large number of teeth and, at least one larger diameter sprocket having at the outer periphery thereof a larger number of teeth than said number of teeth at the smaller diameter sprocket, each of said sprockets being assembled in such a manner that: the center of a space between the teeth of one pair of adjacent teeth at said larger diameter sprocket is positioned on a tangent line with respect to the smaller diameter sprocket, said tangent line being drawn from the center of a space between teeth of one of a pair of adjacent teeth at the smaller diameter sprocket and along the travel of a driving chain when switched to the larger diameter sprocket from the smaller diameter sprocket in mesh with said chain; and a distance between said center of the space between said teeth at the smaller diameter sprocket and said center of the space between said teeth at the larger diameter sprocket is made substantially equal to an integer multiple of the pitch of said chain, said larger diameter sprocket including a first group of teeth among the large number of teeth of a first configuration different from the configuration of a second group of the larger number of teeth to receive a chain moving towards the edge of said larger diameter sprocket with less interference with the chain during shifting than is experienced by said second group.

2. The multi-speed sprockets according to claim 1, wherein one tooth of the large number of teeth provided at the larger diameter sprocket circumferentially thereof and an adjacent tooth to said one tooth form said first group of teeth, said one tooth being positioned rearwardly in the forward rotating directions of both said sprockets with respect to said tangent line drawn from the center of the space between said adjacent teeth at the smaller diameter sprocket, said one tooth facing the center of the space between said adjacent teeth at the larger diameter sprocket, each of the teeth in each of said first groups being positioned toward the edge of the larger diameter sprocket facing said smaller diameter sprocket with respect to the center line of the width of said larger diameter sprocket.

3. The multi-speed sprockets according to claim 2, wherein each of the teeth in each of said first group is slanted with respect to the center line of thickness facing the larger diameter sprocket so that one slantwise end of the same is positioned at a side of the smaller diameter sprocket.

4. The multi-speed sprockets according to claim 1, wherein among the large number of teeth provided at the larger diameter sprocket circumferentially thereof, are included teeth other than those included in said first group each comprising: a tooth being positioned rearwardly in the forward rotating directions of both of said sprockets with respect to the tangent line drawn from the center of the space between said adjacent teeth at the smaller diameter sprocket and facing the center of the space of said adjacent teeth at the larger diameter sprocket; and at least one of the teeth adjacent to said one tooth; said teeth other than said first group are divided into a second group, said teeth included in said second group being positioned away from the smaller diameter sprocket respectively.

5. The multi-speed sprockets according to claim 4, wherein the teeth in said first group are shifted toward the smaller diameter sprocket with respect to the center line of the width of the larger diameter sprocket.

6. The multi-speed sprockets according to claim 1, wherein among the teeth provided at the larger diameter sprockets circumferentially thereof, other than those in the first group one tooth is positioned rearwardly in the forward rotating directions of both said sprockets with respect to the tangent line drawn from said center of the space between said adjacent teeth at the smaller diameter sprocket; and with at least one tooth adjacent to said one tooth forms a second group, each of the teeth of said second group being cut out at a tip thereof, thereby facilitating removal of said chain from the larger diameter sprocket.

7. The multi-speed sprockets according to claim 6, wherein said teeth in the first group are shifted toward the smaller diameter sprocket with respect to the center line of thickness of the larger diameter sprocket.

8. Multi-speed sprockets for a bicycle and the like, comprising at least one small diameter sprocket having at the outer periphery thereof a large number of teeth and, at least one larger diameter sprocket having at the outer periphery thereof a larger number of teeth than said number of teeth at the smaller diameter sprocket, each of said sprockets being assembled in such a manner that: the center of a space between the teeth of one pair of adjacent teeth at said larger diameter sprocket is positioned on a tangent line with respect to the smaller diameter sprocket, said tangent line being drawn from the center of a space between teeth of one of a pair of adjacent teeth at the smaller diameter sprocket and along the travel of a driving chain when switched to the larger diameter sprocket from the smaller diameter sprocket in mesh with said chain; and a distance between said center of the space between said teeth at the smaller diameter sprocket and said center of the space between said teeth at the larger diameter sprocket is made substantially equal to an integer multiple of the pitch of said chain, said larger diameter sprocket including a first group of teeth among the large number of teeth which are shaped different than the remainder of said large number of teeth to receive a chain moving towards the edge of said larger diameter sprocket with less interference with a chain being shifted than is produced from said remaining teeth.

* * * * *